(12) United States Patent
Lamprecht et al.

(10) Patent No.: US 9,440,606 B2
(45) Date of Patent: Sep. 13, 2016

(54) SYSTEM FOR OBTAINING RULE SETS FOR MOTOR VEHICLE AUTOMATION

(71) Applicant: AUDI AG, Ingolstadt (DE)

(72) Inventors: Andreas Lamprecht, Neuburg (DE); Andre Hainzlmaier, Geisenfeld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/769,546

(22) PCT Filed: Feb. 14, 2014

(86) PCT No.: PCT/EP2014/000408
§ 371 (c)(1),
(2) Date: Aug. 21, 2015

(87) PCT Pub. No.: WO2014/127898
PCT Pub. Date: Aug. 28, 2014

(65) Prior Publication Data
US 2015/0375699 A1    Dec. 31, 2015

(30) Foreign Application Priority Data
Feb. 22, 2013    (DE) ........................ 10 2013 003 042

(51) Int. Cl.
*B60R 16/037* (2006.01)
*G01C 21/36* (2006.01)
(Continued)

(52) U.S. Cl.
CPC ............. *B60R 16/037* (2013.01); *G01C 21/36* (2013.01); *G07C 5/008* (2013.01); *G08G 1/162* (2013.01); *G08G 1/166* (2013.01)

(58) Field of Classification Search
CPC .... B60R 16/037; G01C 21/36; G07C 5/008; G08G 1/162; G08G 1/166

USPC .......................................... 701/2, 36, 45, 49
See application file for complete search history.

(56) References Cited

U.S. PATENT DOCUMENTS 6,553,308 B1    4/2003  Uhlmann
8,918,279 B2 *  12/2014 Yonezawa .......... G01C 21/3492
                                                    340/995.13

(Continued)

FOREIGN PATENT DOCUMENTS

DE    19832096    1/1999
DE    10142836    5/2003
(Continued)

OTHER PUBLICATIONS
International Search Report issued by the European Patent Office in International Application PCT/EP2014/000408 on Feb. 14, 2014.

*Primary Examiner* — Thomas Tarcza
*Assistant Examiner* — Tyler J Lee
(74) *Attorney, Agent, or Firm* — Henry M. Feiereisen LLC

(57) ABSTRACT

A method for obtaining rule sets for a motor vehicle to be automated includes receiving with a stationary central server arrangement from each respective one of a plurality of other motor vehicles at least one item of activation information regarding a vehicle function activated in the respective motor vehicle in an actual situation encountered by the respective motor vehicle, and a respective data set including vehicle data determined by the respective motor vehicle in the respective actual situation; generating with the centralized server rule sets on the basis of the respective data set and the at least one item of activation information, wherein each rule set defines an activation condition and a vehicle function to be activated when the activation condition is satisfied; and transmitting the rule sets to the motor vehicle to be automated. The motor vehicle to be automated is configured to detect whether a situation-specific data set generated by the motor vehicle to be automated satisfies the activation condition, and to autonomously activate the vehicle function when the data set satisfies the activation condition.

13 Claims, 1 Drawing Sheet

(51) Int. Cl.
*G07C 5/00* (2006.01)
*G08G 1/16* (2006.01)

(56) References Cited

U.S. PATENT DOCUMENTS

| | | | |
|---|---|---|---|
| 2007/0008090 A1* | 1/2007 | Gertsch | B60P 1/045 340/435 |
| 2009/0076774 A1* | 3/2009 | Miyajima | G08G 1/0104 702/179 |
| 2009/0212905 A1 | 8/2009 | Batz | |
| 2011/0196601 A1* | 8/2011 | Miura | G01C 21/3469 701/532 |
| 2012/0035848 A1* | 2/2012 | Yonezawa | G01C 21/3492 701/414 |
| 2012/0173530 A1* | 7/2012 | Kurciska | G06F 17/30241 707/738 |
| 2013/0317692 A1* | 11/2013 | Iga | G07C 5/008 701/31.4 |

FOREIGN PATENT DOCUMENTS

| | | |
|---|---|---|
| DE | 102004032983 | 1/2006 |
| DE | 102007003337 | 7/2008 |
| DE | 102009049110 | 4/2011 |
| DE | 102009050056 | 5/2011 |
| DE | 102009060226 | 6/2011 |
| DE | 102010053037 | 10/2011 |
| DE | 102010051205 | 5/2012 |
| DE | 102012012635 | 1/2013 |
| GB | 2475871 | 8/2011 |
| WO | WO2010/134824 | 11/2010 |

* cited by examiner

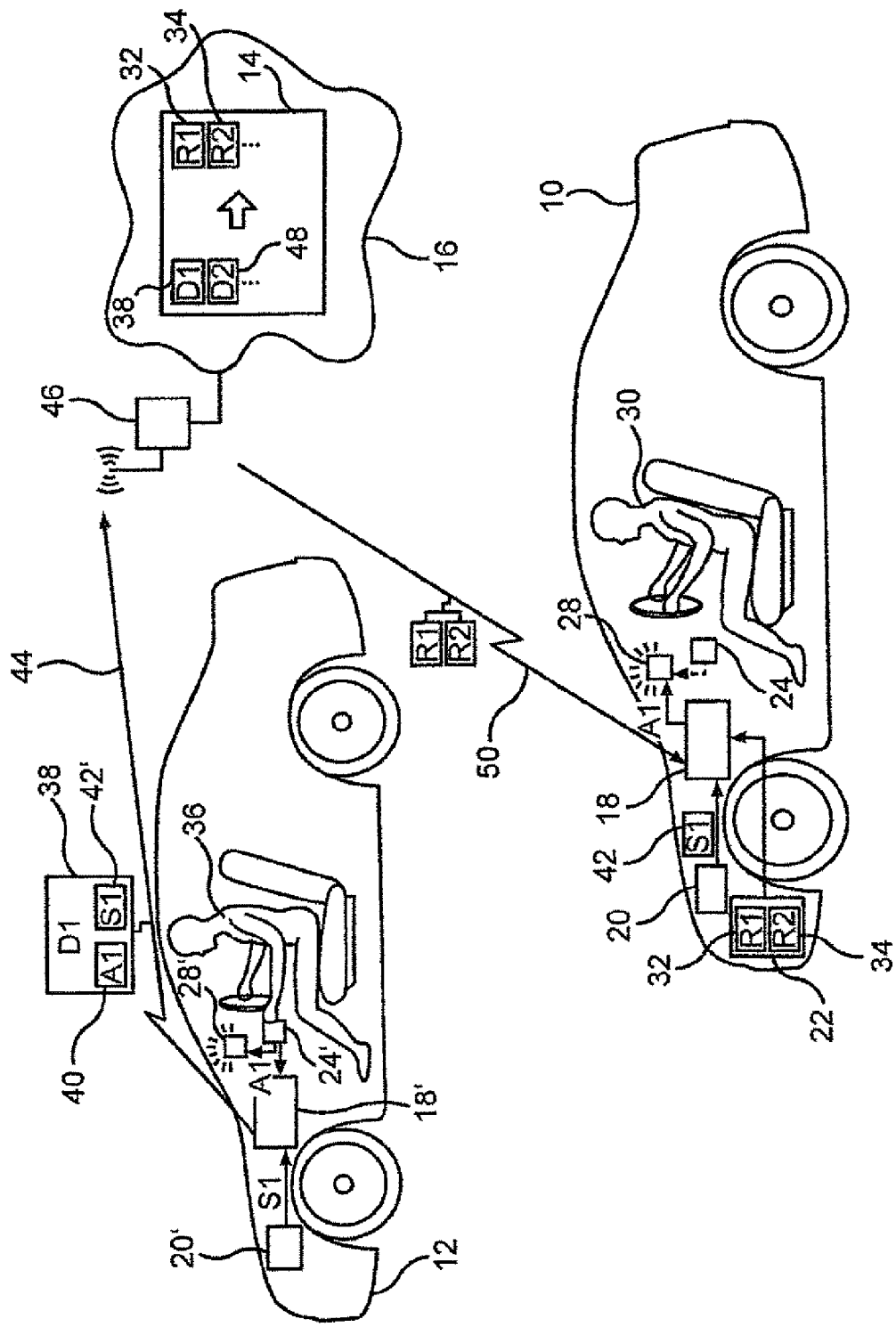

SYSTEM FOR OBTAINING RULE SETS FOR MOTOR VEHICLE AUTOMATION

CROSS-REFERENCES TO RELATED APPLICATIONS

This application is the U.S. National Stage of International Application No. PCT/EP2014/000408, filed Feb. 14, 2014, which designated the United States and has been published as International Publication No. WO 2014/127898 and which claims the priority of German Patent Application, Ser. No. 10 2013 003 042.0, filed Feb. 22, 2013, pursuant to 35 U.S.C. 119(a)-(d).

BACKGROUND OF THE INVENTION

The invention relates to a method for obtaining rule sets for a motor vehicle. Each rule set includes an activation condition and a vehicle function to be activated when the activation condition is satisfied. The motor vehicle is correspondingly configured to repeatedly determine vehicle data in different situations and to examine each corresponding data set as to whether it satisfies the activation condition of one of the rule sets. When this is the case, the associated vehicle function is activated by the motor vehicle or its activation is at least suggested.

Such a motor vehicle is for example known from DE 10 2010 051 205 A1. The motor vehicle described in this publication includes a display device to display images, which can be generated by different cameras of the motor vehicle. During a drive, the motor vehicle measures for example the driving speed. When the driving speed satisfies a defined predetermined condition, the motor vehicle automatically switches over the display device to another camera. The condition for the driving speed hereby results from an observation of the user behavior of an operator within the motor vehicle. When the operator manually repeatedly switches over the display device at a certain speed, the motor vehicle thereby "learns" the condition for the driving speed and then automatically changes the display after a predetermined number of operational procedures.

The known display device requires a learning phase, during which the operating behavior of the operator has to be observed to determine the activation conditions for switching over the display. A self-switching user interface is also known from DE 10 2009 049 110 A1. The user interface described therein determines context data regarding a current driving situation and switches between a display mode and an operating mode depending on the context data. In the operating mode the user interface displays operating information regarding an input device on a display. In the display mode on the other hand, information is provided which is not assigned to an operating step.

SUMMARY OF THE INVENTION

Object of the invention is to automatically activate vehicle functions in a motor vehicle in a situation-dependent manner without an elaborate learning phase.

The object is achieved by a method according to patent claim 1, a server arrangement according to claim 8, a motor vehicle according to claim 10, a motor vehicle according to claim 13 and a system according to claim 14. Advantageous embodiments of the invention are disclosed in the dependent claims.

The motor vehicles and the server arrangement together form the system according to the invention, by which the learning phase described above is shortened in a motor vehicle to be automated. In other words, the system according to the invention enables obtaining rule sets for the automatic activation without the need for an operator of the automated vehicle repeatedly activating the vehicle function so that the corresponding activation condition is determined by the automated motor vehicle.

The invention is based on the principle that in specific situations or specific places a certain operating action is performed regularly by a great number of other motor vehicles. For example, many persons switch on the vehicle headlights when entering a tunnel. This situation-dependent behavior- or operating pattern of other persons in other motor vehicles or at specific places is observed and used to generate a data base and to then automatically perform the observed operating actions in the motor vehicle to be automated as well, whenever this motor vehicle to be automated finds itself in the same or at least in a similar situation or at the same place or at least a place with similar properties. According to the invention the automation occurs on the basis of rule sets, wherein each rule set defines an activation condition and a vehicle function to be activated, when the activation condition is satisfied. In the example mentioned above, the described operating pattern can therefore be used as a basis for a rule set of the following kind: "When the navigation system signals that a tunnel is being entered, switch on the vehicle headlights."

To implement the invention, the motor vehicle to be automated has to be configured to determine a data set for a current situation, which includes vehicle data that can be gathered by the vehicle in the current situation and are situation-dependent, i.e., they reflect the current situation. For example, the vehicle data may be obtained with a rain and temperature sensor so that the data set then describes a situation in which it is currently raining and in which the temperature is only a few degrees above zero. In the above example, a status report of the navigation system ("entering tunnel") is taken into account.

The invention assumes that the vehicle to be automated is configured to check whether the respective data set of vehicle data satisfies at least one of the activation conditions as defined by the rule sets. In the event that one of the activation conditions is satisfied, the associated vehicle function is automatically activated by the motor vehicle or its activation is suggested to at least one operator of the motor vehicle.

In order to form the described data base for obtaining the rule sets, the method according to the invention provides that a stationary, central server arrangement, for example a sever-computer-device of the internet, receives from multiple other motor vehicles information relating to in what situation an operator has activated what vehicle function or in what situation the motor vehicle itself has automatically activated a vehicle function, such as the anti-lock braking system or an electronic stabilization program (ESP). The server arrangement therefore receives at least one item of activation information relating to a vehicle function that was activated in a specific situation which the motor vehicle encountered. In addition to the activation information, the server arrangement receives a data set of vehicle data that the motor vehicle has determined in the respective situation, such as a data set of sensor data of one or multiple motor vehicle sensors and/or status reports of one or multiple vehicle components.

In this way, the server arrangement establishes the data base, which reveals for many different situations, what vehicle data a vehicle has respectively determined and what vehicle function was activated in the situation. The vehicle data thus describe the respective situation.

On the basis of the received data set and the associated activation information, the sever arrangement then forms the at least one rule set and transmits it to the motor vehicle to be automated. This has the advantage that the motor vehicle to be automated is already automatically personalized without the involvement of an operator of the motor vehicle. In the motor vehicle, vehicle functions are automatically activated or at least suggested on the basis of the rule sets, i.e., in situations which would most likely also cause the operator in the motor vehicle, for example the driver, to activate the respective vehicle function or to select the same from an operating menu and then activate it.

The used vehicle data for describing the situations can be of many different types. Advantageously, the vehicle data include information regarding at least one of the following situation criteria: a current position of the motor vehicle, i.e. an absolute position specification, a relative position specification, for example a distance to a vehicle ahead, a driving speed of the motor vehicle, a temperature, for example an outside temperature or inside temperature, a standing duration of the respective motor vehicle, i.e., for example a parking time or standing time at a traffic light, a date (time, weekday, month, season), a value of an operating parameter of the respective motor vehicle (for example tank level, rotation speed, position of a convertible top, currently mounted tires).

As described above, a rule set should also cause an activation of a suitable vehicle function when a current situation or current location of the motor vehicle to be automated does not exactly correspond with a situation or a position that is defined as activation condition by a rule set. For this, the server arrangement advantageously forms the at least one rule data set so that it also includes a tolerance range for testing the presence of the activation condition.

According to an embodiment of the method, a particularly flexible way of forming rule sets, which takes many different items of vehicle data into account (digital values, signal paths, descriptive information such as summer, autumn, winter), is provided in that the server arrangement forms a rule set with at least one if-then-rule for a value from the vehicle data. For example, the following relatively complex situation can be defined as activation condition: If it is "winter" and the vehicle was parked "at least for seven hours" "at night" and the "motor is started", then activate the auxiliary heating.

Over time, the server arrangement according to the invention that performs the method according to the invention, can receive information from a large number of motor vehicles. From several hundred motor vehicles and even from several thousands of motor vehicles, information can be respectively received for a number of different situations regarding what vehicle function was activated in the respective situation and what vehicle data resulted in the respective situation. In order to efficiently establish informative rule sets, an embodiment of the method provides to search for at least one operating pattern in the received data sets and the associated activation information by means of a method known as data-mining, which operating pattern indicates a vehicle function that is typically activated in typical recurring situations. Information regarding an appropriate data-mining method is disclosed in the publications of the education and research unit for database systems by Prof. Dr. Hans-Peter Kriegel at the Ludwig-Maximilians-University Munich.

It has proven to be particularly advantageous when, in addition to the data set of the other motor vehicles, a rule set is determined also on the basis of traffic data that have been collected independent of the respective motor vehicle. Thus, for example the fact that a specific crossroad is particularly accident-prone can also be considered in a rule set. For example, in case of an accident-prone crossroad an assistance functionality of a navigation system can be activated as vehicle function, which provides the driver with an improved overview over the crossroad in front of him. For example, a zoom-function of the navigation system may be activated by which geographical details concerning the crossroad are better recognizable for the driver. In other words, from the additional data regarding specific places or typical traffic situations a rule set can be formulated, which takes these typical cases into account.

Beside the described server arrangement, implementation of the method according to the invention also requires on one hand motor vehicles to gather the activation functions and the corresponding data sets that describe the situation, and on the other hand a motor vehicle that can be automated by the rule sets of the server arrangement.

Correspondingly, an aspect of the invention relates to a motor vehicle, which is configured to a) gather at least one item of activation information regarding an operational action, i.e., regarding a vehicle function that is activated in a specific situation and b) to generate a data set of situation-dependent vehicle data in the respective situation, which were determined by the motor vehicle. The motor vehicle then transmits the activation information and the corresponding data set to the sever arrangement according to the invention.

On the other hand, the invention provides as recipient of the rule sets of the server arrangement a motor vehicle, which as described includes a memory for at least one rule set, and which is configured to generate a data set from current vehicle data relating to a current situation and to check this data set as to whether it satisfies one of the activation conditions of the rule sets. When the activation condition is satisfied, the vehicle can then autonomously activate the corresponding vehicle function or suggests the activation to at least one operator within the motor vehicle. The motor vehicle according to the invention is configured to receive at least one rule set from a server arrangement according to the invention and to store it in its memory.

Preferably, the motor vehicle according to the invention is configured to indicate the autonomous activation of a vehicle function to an operator. This has the advantage that the operator is alerted to a change of the vehicle's condition.

Particularly preferably, an operating device is provided in the motor vehicle, which is configured to reverse the activated vehicle function. For this, the operating device is configured so that an operator always has to operate the operating device in the same manner to reverse the activation, regardless of what vehicle function was activated. This has the advantage that in case the operator is surprised by an activation of a vehicle function, the same operational action of the operating device has to be performed to immediately restore the prior vehicle condition. This is particularly safe.

In the context of the invention, the described vehicle functions are particularly to be understood as: a change of a view in a navigation system, a crossroad assistant in a navigation system by which view is displayed on a monitor of the navigation system, which view is adjusted for driving through a crossroad, a seat heating, a rear window heating, a vehicle lighting, an air conditioner.

BRIEF DESCRIPTION OF THE DRAWING

In the following, the invention is described on the basis of a concrete exemplary embodiment. In the exemplary embodiment, the described components of the embodiment and the described steps of the process are each individual features of the invention, that have to be regarded as part of the invention taken by themselves and also in combinations that are different from the ones shown. Furthermore, the described embodiment may also include additional features of the invention described above.

FIG. 1 shows a motor vehicle 10 and a motor vehicle 12 and a server arrangement 14 of the Internet 16. The motor vehicles 10, 12 can for example be passenger cars. The server arrangement 14 can include one or multiple computers.

DETAILED DESCRIPTION OF PREFERRED EMBODIMENTS

The motor vehicle 10 includes a control device 18, sensors 20, a memory 22, an operating device 24 and one or multiple vehicle components 26. The components 28 are represented in FIG. 1 by a single symbol. Within the motor vehicle 10, a driver 20 may operate the components 28 by operating the operating device 2, i.e., activate functions that are provided by the components 28. It is also possible, however, that the vehicle functions of the motor vehicle 10, provided by the components 28, are autonomously activated by the motor vehicle 10 without the involvement of the driver 30. This is made possible by the control device 18. The control device 18 can for example be a control unit or a central processor of the motor vehicle 10.

The control device 18 analyses vehicle data that are generated by a sensors 20 of the motor vehicle 10. The sensors 20 may include only a part or all sensors known in the art that are typical for a motor vehicle. For example, the sensors 20 may include a temperature sensor, a GPS-receiver (GPS—Global Positioning System), a camera, a distance radar or lane change assistant. The sensors 20 may, in connection with the invention, include for example the navigation system including the navigation data provided by the same, a traffic information system such as RDS (Radio Data System), a telephony module, which indicates incoming telephone calls and further components of the motor vehicle 10 capable to describe a current driving situation of the motor vehicle 10 by their signals.

Rule sets 32, 34, (R1, R2) can be stored in the memory 22. Each rule set 32, 34 describes an assignment rule, by which certain values of vehicle data, as generated by the sensors 20, are assigned to a vehicle function of the components 28 to be activated, when these values are present. At predetermined time points the control device 18 receives from the sensors 20 a respective data set 42 of actual vehicle data describing the current situation and analyses whether the activation conditions as described by rules 32, 34 are satisfied. When one of the activation conditions is satisfied, the control device 18 activates the corresponding vehicle function in the components 28.

For better understanding, it is assumed that the rule set 32 (R1) defines a value combination of vehicle data as activation condition, which describes a situation S1. In the situation S1, a vehicle function A1 is to be activated. For example, the situation S1 can be described in that it is raining, the outside temperature is <5° C., it is dark outside and the driver is situated on a country road in a wooded area. The vehicle function to be activated is then for example the windshield heater.

In the shown example, it is also assumed that vehicle data were generated by the sensors 20, which indicate that the situation S1 is actually given. When now the control device recognizes that the situation S1 is given, the vehicle data generated by the sensors 20 correspond with the value intervals that are predetermined by the rule set 32 (R1). Correspondingly, the control unit 18 determines the vehicle function A1 to be activated from the rule set 32 and correspondingly controls the components 28. In the present example the windshield heater is activated without the need for the driver 30 to operate the operating device 24 himself.

The driver also did not have to determine the rule sets 32, 34. These also did not have to be predetermined during manufacturing of the motor vehicle 10. The rule sets 32, 34 were determined on the basis of observing the operating behavior of other drivers in other motor vehicles. For this purpose, specific motor vehicles were observed by the server arrangement 14. One of these motor vehicles is the motor vehicle 12. Within motor vehicle 12, similar to motor vehicle 10, vehicle components 28' for providing vehicle functions, an operating device 24' to operate the components 28', a control device 18', and sensors 20' are provided. These components can be interconnected in the same way as those of motor vehicle 10 so that a further description is not necessary.

Whenever an operator, for example the driver 36, activates a vehicle function in the motor vehicle 12 by using an operating device 24' provided by the components 28', this process is also captured by the control device 18'. For the thus determined activated vehicle function, a data set 42' is provided, which includes the vehicle data that were just generated by the sensors 20'. These vehicle data describe the current situation in which the driver 36 has activated the vehicle function by means of the operating device 24'. In the example it is assumed that when the vehicle function A1 was activated in the motor vehicle 12, the situation S1 was just signaled by the vehicle data of the sensors 20'. The control device 18' forms a data package 38 (D1) from an item of activation information 40, which describes the recognized vehicle activity A1 and the data set 42' and sends the data package 38 via a radio connection 44 for example to a mobile radio network 46, which is connected to the internet 16 and via which the data package 38 is received by the sever arrangement 14.

In addition to the data package 38, the server arrangement also receives further data packages from motor vehicle 12 and from other motor vehicles, of which only one further data package 48 is shown in FIG. 1, which may include data D2, regarding a different or the same vehicle function A1, and data sets regarding the same situation S1 or a different situation. The gathered data packages 38, 48 with activation information and associated data sets are analyzed by the server arrangement 14 as to whether a regularity regarding an operating pattern of operators in motor vehicles, such as motor vehicle 12, is recognizable. For this purpose, a data mining method may for example be used. From each recognized operating pattern, a corresponding rule set 32, 34 is established. The rule sets 32, 34 are then transmitted from the server arrangement 14, for example via the mobile network 46 and a mobile phone connection 50, to motor vehicles such as motor vehicle 10, which have a memory 22 for rule sets. Thus it is possible that the control device 18 activates the vehicle function A1 for example for driver 30 in the same situation S1 in which driver 36 and other drivers previously found themselves, without driver 30 having to take action.

It is further preferred that the driver 30 can reverse the automatically performed operating action, i.e., reverse the activation of a specific vehicle function, for example by pushing a button of the operating device 24. Further preferably, the activation of a vehicle function is displayed to the driver 30 for example on a display device, i.e., this event is generally signaled (graphically, haptic, acoustically). This prevents that the driver 30 is surprised and is distracted from traffic.

The example shows how the motor vehicle 10 automatically performs a personalization and how the driver is thereby informed and also enabled to reverse an individual action. Items of information regarding the vehicle operation together with vehicle data (as for example the position or vehicle speed) are transmitted from a motor vehicle 12 to a central server 14 and compared to data from other motor vehicles. Hereby, notable occurrences are identified and correspondingly, rules are established which, for instance, can be formulated as follows: "If factors x, y, z show a certain characteristic, then execute action a."

When drivers of different vehicles always perform the same operating actions at defined locations or defined time points in response to recurring events, this is now automated in the motor vehicle 10.

The invention claimed is:

1. A method for obtaining rule sets for a motor vehicle to be automated, comprising:
receiving with a stationary central server arrangement from each respective one of a plurality of motor vehicles at least one item of activation information regarding a vehicle function activated in the respective motor vehicle in an actual respective situation encountered by the respective motor vehicle;
receiving with the stationary central server arrangement a respective data set comprising vehicle data determined by the respective motor vehicle in the respective actual situation;
generating with the stationary centralized server rule sets on the basis of the respective data set and the at least one item of activation information received from each respective motor vehicle, each said rule set defining an activation condition and a vehicle function to be activated when the activation condition is satisfied, wherein at least one of the rule sets comprises an if-then-rule for a value of the vehicle data; and
transmitting the rule sets to the motor vehicle to be automated, said motor vehicle to be automated being configured to detect another data set for the actual situation encountered by the motor vehicle to be automated, said other data set comprising vehicle data specific for the actual situation encountered by the motor vehicle to be automated, said motor vehicle to be automated being further configured to analyze whether the other data set satisfies one of the activation conditions and, to autonomously activate the vehicle function or to suggest activation of the vehicle function when the other data set satisfies the one of the activation conditions.

2. The method of claim 1, wherein the activation information indicates a type of operating action performed by an operator of the respective motor vehicle in the respective actual situation.

3. The method of claim 1, wherein the vehicle data determined by the respective motor vehicle comprise information regarding at least one situation feature selected from the group consisting of an actual position, an absolute position, a driving speed, a temperature, a standing period of the respective motor vehicle, a time information, and a value of an operating parameter of the respective motor vehicle.

4. The method of claim 1, wherein the at least one rule set comprises a tolerance range for verifying a whether the activation condition is satisfied.

5. The method of claim 1, further comprising forming at least one of the data sets by recognizing at least one operating pattern in the respective data sets by using a data-mining process.

6. The method of claim 1, wherein at least one of the rule sets is additionally established on the basis of traffic data collected independent of the respective motor vehicle.

7. A server arrangement for operation in the Internet, said server arrangement being configured to implement the method of claim 1.

8. A motor vehicle, comprising:
a memory for storing at least one rule set, said at least one rule set defining an activation condition and a vehicle function to be activated when the activation condition is satisfied,
an operating device configured to reverse the activation of the vehicle function in response to operation of the operating device,
said motor vehicle being configured to determine a data set relating to an actual situation encountered by the motor vehicle, said data set comprising vehicle data specific for the actual situation, said motor vehicle being further configured to analyze whether the data set satisfies the activation condition, and to autonomously activate the vehicle function or to suggest an activation to the vehicle function when the data set satisfies the activation condition, wherein the motor vehicle is configured to receive the at least one rule set from a stationary server arrangement, said stationary server arrangement being configured
to receive from each respective one of a plurality of motor vehicles at least one item of activation information regarding a vehicle function activated in the respective motor vehicle in an actual respective situation encountered by the respective motor vehicle,
to receive respective data sets, each comprising vehicle data determined by the respective motor vehicle in the respective actual situation, and
to generate the rule sets on the basis of the data set and the at least one item of activation information received from each respective motor vehicle.

9. The motor vehicle of claim 8, wherein the motor vehicle is further configured to indicate the automatic activation of the vehicle function to an operator.

10. A motor vehicle configured to gather at least one item of activation information regarding a vehicle function which is activated in a respective actual situation encountered by the motor vehicle and to generate a data set from vehicle data that are specific for the respective actual situation, and to transmit the activation information and the data set to a stationary server arrangement, said stationary server arrangement being configured
to generate rule sets on the basis of the data set and the at least one item of activation information received from the motor vehicle, each said rule set defining an activation condition and a vehicle function to be activated when the activation condition is satisfied, wherein at least one of the rule sets comprises an if-then-rule for a value of the vehicle data, and to transmit the rule sets to another motor vehicle to be automated, said other motor vehicle being configured to detect another data set for the actual situation encountered by the other motor, said other data set comprising vehicle data specific for the actual situation encountered by the other motor vehicle, said other motor vehicle being further configured to analyze whether the other data set satisfies the activation condition, and to autonomously activate the vehicle function or to suggest activation of the vehicle function when the other data set satisfies the activation condition.

11. The motor vehicle of claim 8, wherein the vehicle function comprises at least one member selected from a member of the group consisting of a change of view in a navigation system, a crossroad assistant in a navigation system, a seat heating, a rear window heating, a vehicle lighting, and an air conditioner.

12. The motor vehicle of claim 11, wherein the vehicle function comprises at least one member selected from a member of the group consisting of a change of view in a navigation system, a crossroad assistant in a navigation system, a seat heating, a rear window heating, a vehicle lighting, and an air conditioner.

13. A system, comprising:
   at least one motor vehicle configured to gather at least one item of activation information regarding a vehicle function of the at least one motor vehicle activated in a respective actual situation encountered by the at least one motor vehicle and to generate a data set from vehicle data that are specific for the respective actual situation;
   a server arrangement configured to generate rule sets on the basis of the data set and the at least one item of activation information received from the at least one motor vehicle, each said rule set defining an activation condition and a vehicle function to be activated when the activation condition is satisfied, wherein at least one of the rule sets comprises an if-then-rule for a value of the vehicle data; and
   another motor vehicle receiving at least one of the rule sets and comprising a memory for storing the at least one rule set, said other motor vehicle being configured to determine another data set relating to an actual situation encountered by the other motor vehicle, said other data set comprising vehicle data specific for the actual situation encountered by the other motor vehicle, said other motor vehicle being further configured to analyze whether the other data set satisfies the activation condition, and to autonomously activate the vehicle function or to suggest an activation to the vehicle function when the other data set satisfies the activation condition.

* * * * *